Nov. 15, 1938.  W. B. DEAN  2,136,733
RAIL CAR TRUCK
Filed March 18, 1936

INVENTOR.
WALTER B. DEAN.
BY
*John P. Tarbox*
ATTORNEY.

Patented Nov. 15, 1938

2,136,733

UNITED STATES PATENT OFFICE 2,136,733

RAIL CAR TRUCK

Walter B. Dean, Narberth, Pa., assignor to Edward G. Budd Manufacturing Company, Philadelphia, Pa., a corporation of Pennsylvania Application March 18, 1936, Serial No. 69,453

6 Claims. (Cl. 105—225)

This invention relates to a rail car truck, and more particularly to a pedestal liner for such a truck. This application is a continuation in part of my co-pending application, Serial #740,557, filed August 20, 1934, and entitled "Rail car truck".

One of the objects of the invention is to provide very effective cushioning means to deaden the noises and to effectively cushion the various shocks between the journal box and the pedestal.

Another object of the invention is to provide a shock absorbing, vibration eliminating, and sound deadening pad which will reduce the tendency of the truck to transmit vibrations induced by axle reactions, and at the same time to possess sufficient resiliency and flexibility so that the pad is returned to its original form after compressive stresses.

Another object of the invention is to provide a pedestal liner including a rubber compound suitably vulcanized to adjacent metal covers, which may be effectively mounted between the relatively moving parts of the truck.

Further objects and advantages of the invention will appear from the following description thereof taken in connection with the attached drawing, which illustrates a preferred form of embodiment of my invention, and in which:—

Figure 1:
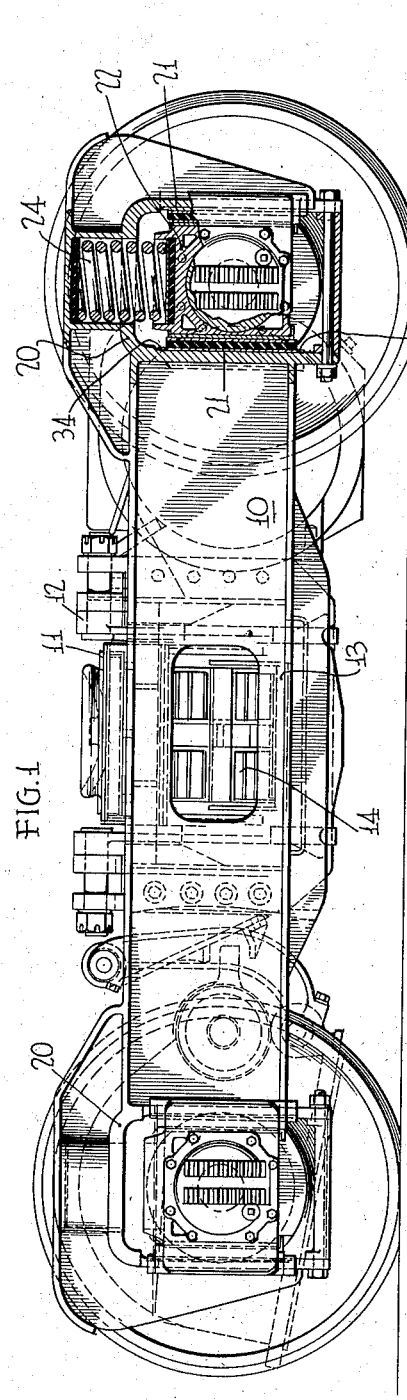
Fig. 1 is a side elevation with parts in section of a truck showing the improved pedestal liner.
Figure 2:
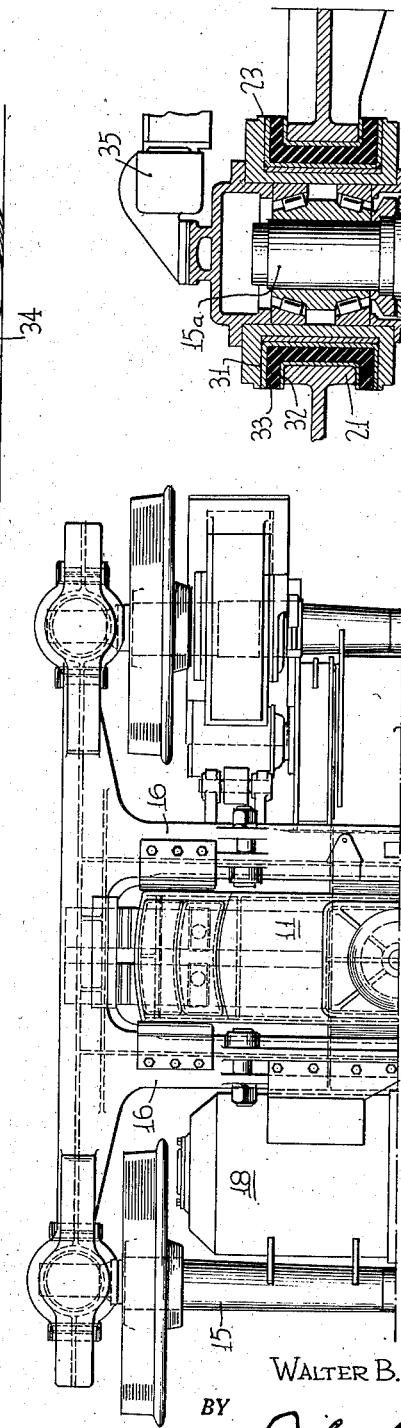
Fig. 2 is a partial top plan view of the truck shown in Fig. 1.

One form of truck to which I conveniently apply resilient pedestal liners is generally shown in Figs. 1 and 2 and includes the truck frame 10, the bolster 11, swing hangers 12 supporting the bolster, spring plank 13, bolster supporting springs 14, axles 15 supporting the truck, spaced transoms 16, and the driving motors generally shown at 18. While I prefer to make this truck of arc welded plates both for chords and webs of the generally I-section frame, it will be apparent that my invention is applicable to any other type of truck frame having pedestals which are generally indicated at 20. The pedestals are preferably of inverted and downwardly open U-form having relatively parallel sides 21 to receive the journal box 22 which, as is well known, carries the bearings 23 for the end 15a of the axle 15. In the particular construction shown springs 24 are provided above the top of the journal for transmitting loads from the journal to the side frame 10 through the spring barrels. Third rail supporting arms 35 extend from the pedestal on one side of the truck.

Figure 3:
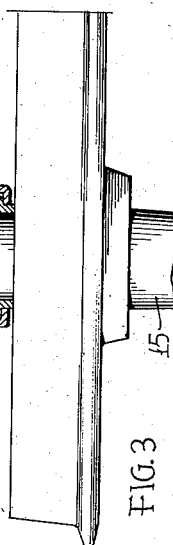
Fig. 3 is an enlarged top plan view with parts in section showing the arrangement of the liner adjacent the pedestal.

In order to provide for quiet operation of the truck, and to take up the shock between the axle and the pedestals in all directions, I provide a novel form of pedestal liner as shown in Fig. 3 between the pedestal sides 21 and the axle bearing 23 sliding in the pedestal. This pedestal liner may be assembled as a unit prior to its assembly in the truck and comprises a U-shaped wear plate 31 and a smaller U-section mounting plate 32, and a U-shaped resilient filler 33 between the side and bottom walls of the plates which is secured thereto in any suitable manner, preferably by vulcanizing to form a unitary liner. This filler is preferably a rubber compound, or one containing a substantial amount of rubber, and may include such other ingredients or separate products as will insure its long life, controlled resilience and freedom from permanent set or swelling. It should be non-metallic however to prevent transmission of harmonic or resonant vibrations, and other products can be used without departing from the spirit of the invention.

To secure the liner in position, the ends 34 of the mounting plate 32 are conveniently extended beyond the ends of the liner, and these extended portions are securely attached to the pedestals by any suitable securing means.

In order to have the rubber of the liner take substantially all of the load in compression, the space between the side walls of the plates 31 and 32 is of less depth than the space between the bottom walls, so that the resilient filler 32 between the bottom walls will not be unduly placed in shear, and also to provide sufficient filler between the bottom walls to take the heavy shocks directed longitudinally in compression. This is particularly of importance with rubber fillers. This mounting of the axle and the pedestals not only diminishes the track noises which are ordinarily transmitted from the wheels through the track frame into the car, but at the same time provides effective shock absorbing means to minimize the pounding usually present between the pedestal and the axle support.

While, by way of illustration and example, I have described by invention in connection with a preferred embodiment thereof as to structure and the preferred manner of practicing it, it will be obvious to those skilled in the art, after understanding the foregoing specification, that various changes and modifications may be made without departing from the spirit or scope of the invention, and I aim in the appended claims to cover all such modifications and changes.

What I claim is:

1. In a truck frame, a downwardly opening U-section pedestal, a liner for the opposite side walls of said pedestal, said liner embodying a wear plate of U-section, a mounting plate also of U-section but of smaller dimensions than the wear plate and a rubber cushion also of substantially U-shape filling the space between the wear plate and the mounting plate, and a journal member between the depending legs of the pedestal, said journal member having thrust means contacting with the side walls of the wear plate.

2. A liner for rail car truck pedestals comprising a wear plate of U-section, a mounting plate also of U-section but of smaller transverse sectional dimensions than said wear plate and a rubber cushion interposed between the side and bottom walls of said U-section plates and vulcanized thereto, said cushion resisting forces normal to the side and bottom walls, and having a substantial depth to minimize shear due to side wall forces.

3. A liner for rail car truck pedestals comprising a wear plate of U-section, a mounting plate also of U-section but of smaller sectional dimensions than said wear plate, the sectional dimensions of the mounting plate and wear plate being so proportioned as to leave a narrower space between their side walls than between their bottom walls, and a rubber cushion filling the space between their side and bottom walls and vulcanized thereto.

4. In a car truck pedestal having oppositely disposed pedestal legs and a journal box between said legs, the combination of a liner and wear plate for each leg comprising a U-shaped member rigidly secured to the pedestal leg, a pad of resilient material overlying each leg and web of the U-shaped member, a U-shaped wear plate adapted to engage the journal box and embracing each said resilient pads, and means connecting said pads to both said U-shaped members whereby the wear plate is maintained in operable relation to the fixed U-shaped member and is movable relative thereto as the pads are compressed under forces exerted on the wear plate by the journal box.

5. In a car truck pedestal having oppositely disposed legs and a journal box between said legs, a wear plate and liner for each pedestal leg comprising a U-shaped member secured in fixed relation to its respective pedestal leg, a U-shaped wear plate overlying and spaced from said U-shaped member, and a U-shaped pad of resilient material secured to both arms and connecting webs of the wear plate and U-shaped member, said pad filling the space between said U-shaped member and the wear plate and connecting the wear plate to the U-shaped member.

6. In combination with a rail car truck, the frame of which includes inverted U-shape pedestal legs having a journal box therebetween, a U-shape wear plate for said journal box having a surface in slidable contact with said journal box, said journal box having projections substantially U-shape in plan embracing the sides of the U-shape wear plate and the side of the pedestal legs and cushion means also of substantially U-shape in plan intermediate and secured to the pedestal legs and the U-shape wear plate whereby lateral and longitudinal forces of said journal box with respect to said truck frame are resisted by the cushions, vertical movements being unresisted thereby.

WALTER B. DEAN.